(No Model.)
W. P. CLOTWORTHY.
PACKING BAKING POWDER.
No. 462,109. Patented Oct. 27, 1891.
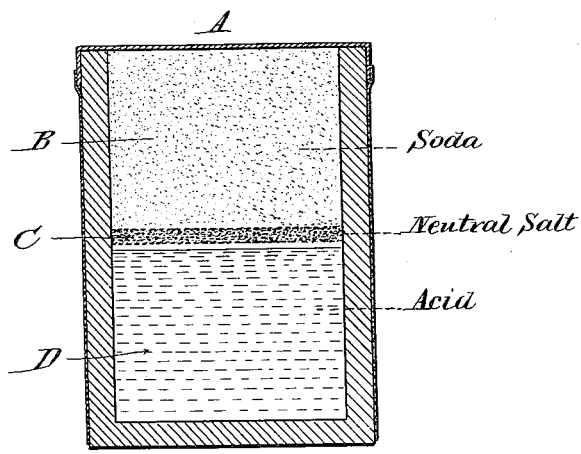
Witnesses:
Alex Scott
Wm Butterworth
Inventor:
William Pitt Clotworthy.
By Henry Browne
Atty.

UNITED STATES PATENT OFFICE.

WILLIAM PITT CLOTWORTHY, OF BALTIMORE, MARYLAND.

PACKING BAKING-POWDER.

SPECIFICATION forming part of Letters Patent No. 462,109, dated October 27, 1891.

Application filed October 11, 1890. Serial No. 367,828. (No model.)

*To all whom it may concern:*

Be it known that I, WILLIAM PITT CLOTWORTHY, a citizen of the United States, residing at the city of Baltimore, in the State of Maryland, have invented a new and useful Improvement in the Packing of Baking-Powders; and I do hereby declare that the following is a full, clear, and exact description of my invention, which will enable others skilled in the art to which it appertains to make and use the same by my novel method.

My invention relates to an improvement in packing baking-powders, which I accomplish by so combining the constituents that no loss of aerating power will take place by the acid constituents acting on the carbonated alkali. At the present time the universal practice of the manufacturers of the baking-powders of commerce is to mix the acid, the carbonate, and starch or flour all together. The starch or flour is used to prevent the rapid deterioration of strength necessarily caused by reason of the action of the acid on the carbonate. Experience has proved that the starch or flour only serves to retard deterioration, and that it is simply a question of time when the whole strength will have been lost. This is particularly the case when the acid phosphate of lime and the bicarbonate of soda are used. The acid phosphate of lime is by all scientific authorities on the subject conceded to be the best acid for bread-making.

In carrying my invention into effect I arrange the constituents in layers or strata in small packages, so that although the layers come in contact the materials are not mixed. The packages may be of tin, wood, or other suitable material.

Reference is hereby made to the drawing, in which A represents the receptacle, B the bicarbonate of soda, C the neutral salt, and D the acid.

By this arrangement a very small proportion of the carbonate and of the acid (about two per centum) are in contact, and, being so, begin at once to form a neutral salt, whereby all further loss of strength is prevented by the formation of this stratum of neutral salt, which is a virtual separator. This method I consider a novel and valuable improvement on the present general practice.

It is generally known that there is a rapid deterioration in the strength of the principal baking-powders on the market, so that if the powders are not fresh or the packages have been opened they are in a great degree of no value. My improvement is applicable to all the acids and carbonates used in the making of bread. By the term "carbonates" I mean the alkaline carbonates and bicarbonates.

I am aware that substantially the same materials have heretofore been used in the composition of baking-powders, and therefore do not claim such a composition, broadly; and I am also aware of the use of a method of separating the ingredients by a partition in the box, thus making separate compartments, and therefore do not claim any such means; but What I do claim as my invention, and desire to secure by Letters Patent, is—

As an article of manufacture, a package of baking-powders consisting of a suitable receptacle A, containing the acid D and carbonated alkali B, placed with their contiguous layers in contact, whereby a dividing-layer of a chemical salt C is formed between the two bodies, substantially as described.

WM. PITT CLOTWORTHY.

Witnesses:
 GEO. W. BELL,
 GEO. L. BOND.